US006362406B1

(12) United States Patent
Enhoffer et al.

(10) Patent No.: US 6,362,406 B1
(45) Date of Patent: Mar. 26, 2002

(54) SHAKEN IDIOPHONE

(75) Inventors: Raymond Enhoffer, Clifton; Richard Simons, Garfield; Andrzej Krol, Lincoln Park, all of NJ (US); Bashiri Johnson, Brooklyn, NY (US)

(73) Assignee: Latin Percussion, Inc., Garfield, NJ (US)

( * ) Notice: Subject to any disclaimer, the term of this patent is extended or adjusted under 35 U.S.C. 154(b) by 0 days.

(21) Appl. No.: 09/764,322

(22) Filed: Jan. 17, 2001

(51) Int. Cl.[7] ................................................ G01D 13/08

(52) U.S. Cl. .............................. 84/402; 84/418; 84/420

(58) Field of Search .......................... 84/402, 403, 410, 84/418, 420

(56) References Cited

U.S. PATENT DOCUMENTS 4,901,617 A * 2/1990 Malone et al. ................ 84/402
5,323,678 A * 6/1994 Yould .......................... 84/418
5,377,575 A * 1/1995 Huth, III ...................... 84/402
6,091,009 A * 7/2000 Simons et al. ................ 84/402

* cited by examiner

*Primary Examiner*—Shih-Yung Hsieh
(74) *Attorney, Agent, or Firm*—Ohlandt, Greeley, Ruggiero & Perle, LLP

(57) ABSTRACT

There is provided a shaken idiophone having at least two segments that define a sound chamber for holding a sound producing material. The segments are preferably located along the periphery of the shaken idiophone. The segments of the shaken idiophone are held together by at least one fastener having a resilient member. The resilient member urges the segments away from one another so that there is a space between the two segments. The amount of space between the segments can be varied while the shaken idiophone in being playing by squeezing the shaken idiophone. Thus, the shaken idiophone can create a variety of sound qualities.

18 Claims, 3 Drawing Sheets

SHAKEN IDIOPHONE

BACKGROUND OF THE INVENTION

1. Field of the Invention

The present invention generally relates to musical instruments. In particular, the present invention relates to shaken idiophones, such as maracas.

2. Description of the Prior Art

Shaken idiophones are, perhaps, the oldest of all instruments. Although humble in form, they are staples in any rhythmic music. Skaken idiophones are easy to play and, if mastered, offer an expressive sound. Thus, it is little wonder that shaken idiophones are popular with all musicians, especially Latin music players.

As used herein, the term "shaken idiophone" includes any musical instrument having a hollow sounding chamber filled with a material that strikes the wall or walls of the hollow sounding chamber when the instrument is moved and, thereby, produces sound. Accordingly, examples of shaken idiophones include maracas, tubular shakers, egg-shaped shakers, box rattles, televis, ekpiris, ganzas, basket rattles (i.e., caxixis), and gourd shakers. Shaken idiophones may be held in the hand or mounted to a stand.

SUMMARY OF THE INVENTION

It is an object of the present invention to provide a shaken idiophone.

It is also an object of the present invention to provide a shaken idiophone having a sound quality that can be varied while the shaken idiophone is being played.

It is another object of the present invention to provide an ergonomically shaped shaken idiophone that has multiple gripping and/or mounting positions.

These and other objects and advantages of the present invention are achieved by a shaken idiophone having at least two segments that define a sound chamber for holding a sound producing material. The segments of the shaken idiophone are held together by at least one fastener having a resilient member. The resilient member urges the segments away from one another so that there is a space between the two segments. The amount of space between the segments can be varied while the shaken idiophone is being playing by squeezing the shaken idiophone. Thus, the shaken idiophone can create a variety of sound qualities.

The segments are preferably located along the periphery of the shaken idiophone. Also, the segments are preferably circular or oval in shape.

DETAILED DESCRIPTION OF THE INVENTION

Figure 1:
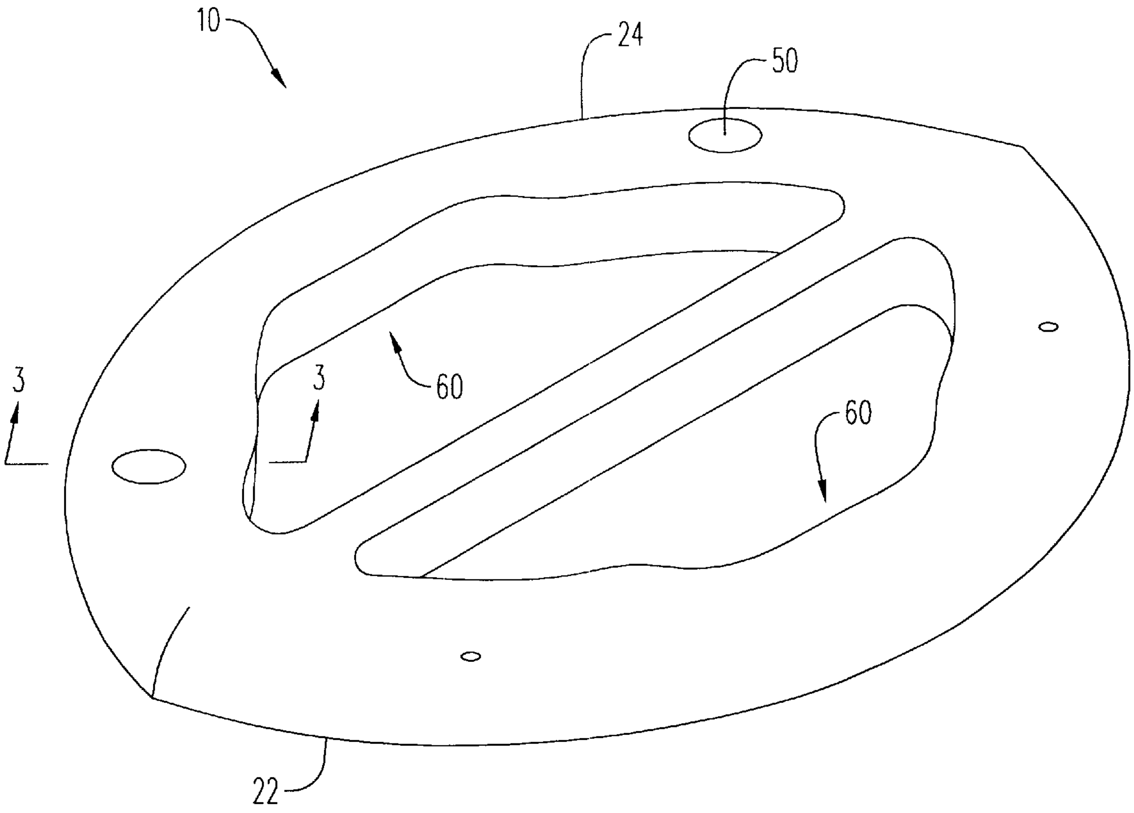
FIG. 1 is a perspective view of a shaken idiophone according to the present invention.

Referring to the drawings and, in particular, FIG. 1, there is provided a shaken idiophone according to the present invention generally represented by reference numeral 10.

Figure 2:
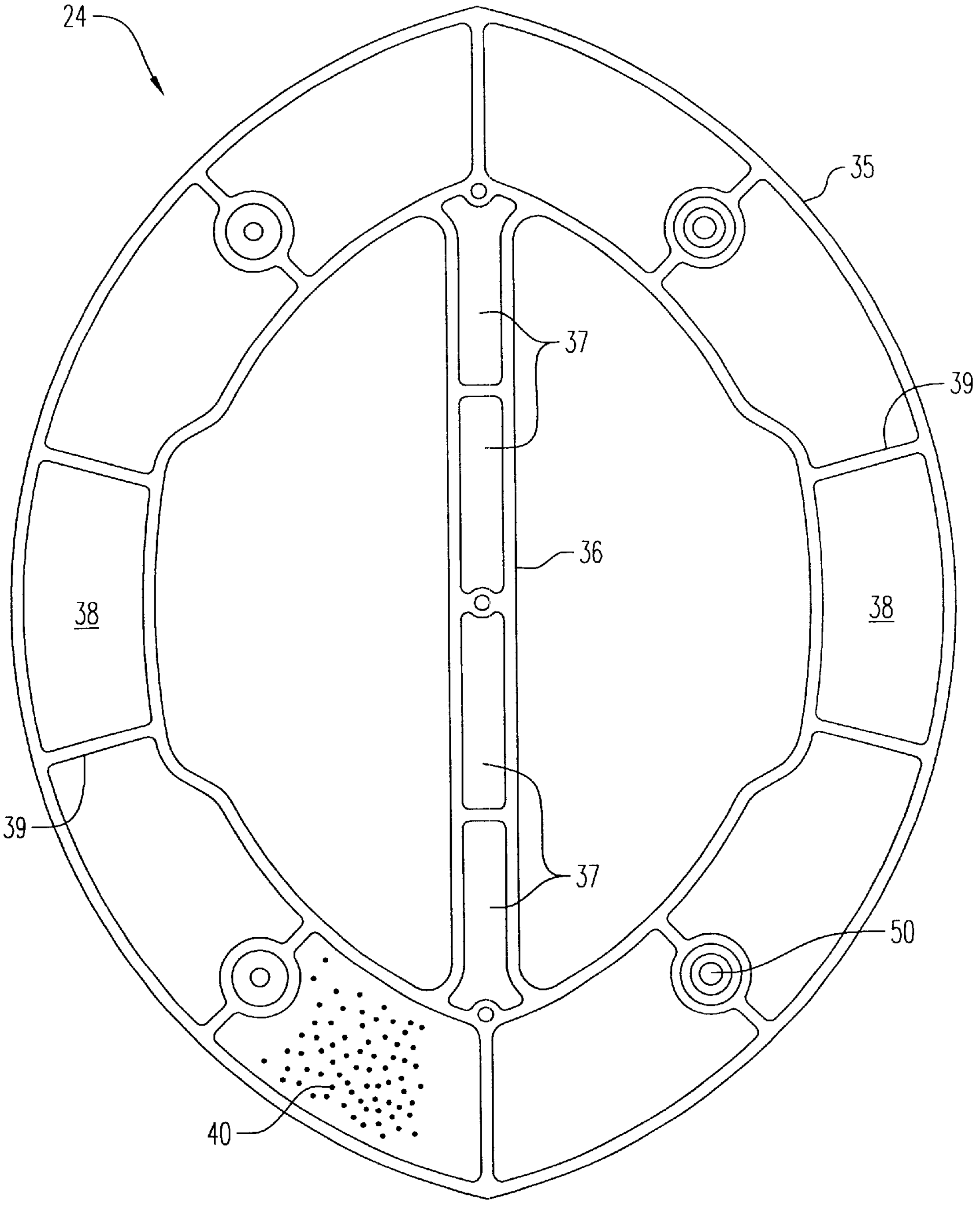
FIG. 2 is a plan view of the interior of a segment of the shaken idiophone of FIG. 1.
Figure 3:
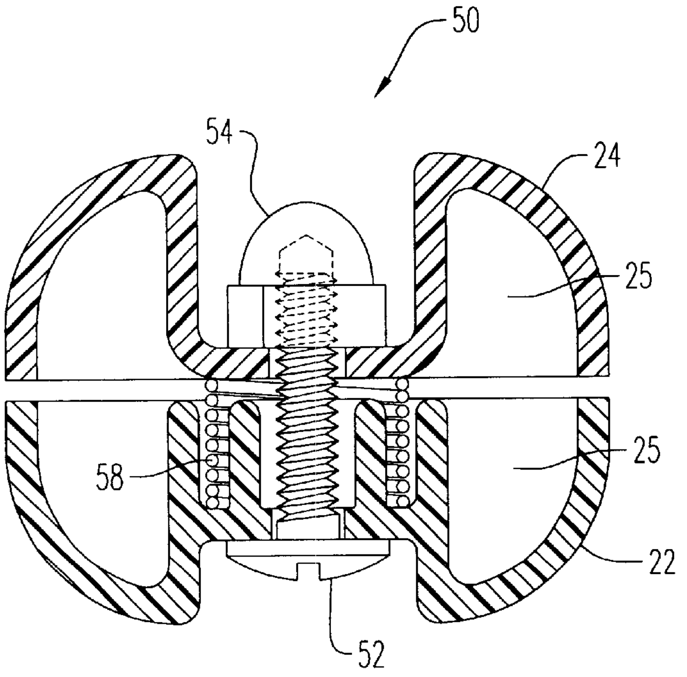
FIG. 3 is a cross sectional view taken along lines 3—3 of the shaken idiophone of FIG. 1 showing the shaken idiophone with a variable closure in an unlocked position.
Figure 4:
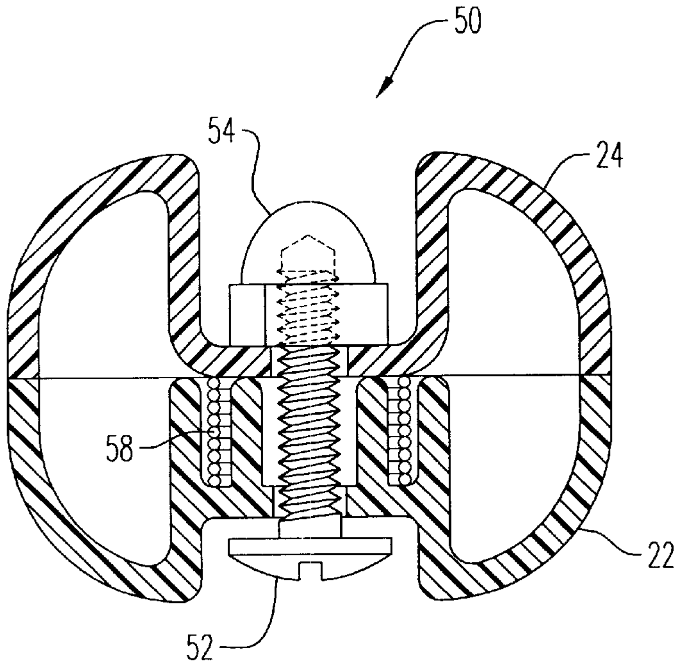
FIG. 4 is a cross sectional view also taken along lines 3—3 of the shaken idiophone of FIG. 1 showing the shaken idiophone with the variable closure in a locked position.

Shaken idiophone 10 has at least two segments 22 and 24 that can be connected together by one or more fasteners 50 shown more clearly in FIGS. 3 and 4. When connected together, segments 22 and 24 are biased away from each other, but are adapted to be moved towards each other to perhaps mate with or contact one another. Segments 22 and 24, when connected together define a shape that can hold an amount of a fill material or sound producing material 40 as shown in FIG. 2.

Segments 22 and 24 need not conform to one another, and may have any cross section that, together, defines a shape that can hold a fill material. Nonetheless, it is preferred that segments 22 and 24 conform to one another such that they are identical or virtually identical in shape. In a preferred embodiment, shaken idiophone 10 has a circular or oval shape. A circular or oval shape shaken idiophone is preferred because such a shaken idiophone lends itself to be played using the same technique that percussionists would use when playing a tambourine. For example, shaken idiophone 10 maybe held in the hand and played as a tambourine (e.g., hitting it against the free hand).

Given that segments 22 and 24 are more preferably identical in shape, the description of segment 24 that will follow is applicable to both segments 22 and 24.

Referring to FIG. 2, segment 24 has a peripheral section 35 and, optionally, a crossbeam 36. Peripheral section 35 preferably has an overall circular or oval shape that forms a hollow cavity 25 shown more clearly in FIG. 3. The peripheral section 35 is preferably divided into two or more chambers or small hollow cavities 38 by one or more separating members 39. The function of the two or more chambers 38 is to prevent fill material 40 from completely migrating to one side of section 35. Thus, chambers 38 balance fill material 40 in peripheral section 35. Moreover, fill material 40 may be selectively placed within all or only some of chambers 38 depending on the sound desired. In addition, chambers 38 are analogous to the manner in which jingles are positioned along the periphery of a tambourine.

When segment 24 has a crossbeam 36, it is preferred that crossbeam 36 is positioned along the longest axis of segment 24. For example, when peripheral section 35 is circular is shape, cross beam 36 extends along the diameter defined by peripheral section 35. Crossbeam 36 may be gripped by the hand and also provides structural support to peripheral section 35. Moreover, cross beam 36 may be shaped to define a second chamber or group of chambers 37 for holding an additional amount of fill material 40.

When segments 22 and 24 are mated, a sound chamber is formed by the respective peripheral sections. Again, an optional sound chamber may be produced by the one or more cross beams. The sounding chamber has a shape and size sufficient to contain sound producing materials 40, so that shaken idiophone 10 produces a sound when it is set in motion by a user. Preferably, segments 22 and 24 each have a substantially curvilinear cross section so that the sound chamber defined thereby is tubular in cross-section as shown in FIGS. 3 and 4. As stated above, it is preferred that the sounding chamber be divided into a plurality of smaller cavities or chambers 38 by the one or more separating members 39. As stated above, cavities 38 allow sound producing material 40 to be selectively held along peripheral section 35 and, preferably, held in a uniform manner in peripheral section 35. Thus, when sounding material 40 is uniformly positioned in peripheral section 35, the sound producing material strikes the walls of shaken idiophone 10 in a metered manner producing a uniform sound.

Referring to FIGS. 3 and 4, segments 22 and 24 are joined together with at least one fastener 50. Fastener 50 may be any type of fastener known in the art. For example, fastener 50 may be a non-locking fastener, such as a snap-fit connection or "sex bolts." Preferably, fastener 50 is a locking fastener, such as the fastener illustrated in FIGS. 3 and 4.

Fastener 50 preferably has a screw 52 that extends through segments 22 and 24, and is locked in place with a cap nut 54. Coextensive along at least a portion of screw 52 is a resilient member 58, which is preferably a spring. Resilient member 58 is adapted to urge segments 22 and 24 away from one another. The purpose of resilient member 58 is to allow segments 22 and 24 to open slightly. The amount of space between segments 22 and 24 affects or changes the sound emitted from shaken idiophone 10. As this space between segments 22 and 24 is varied, the sound produced continues to change. The space between segments 22 and 24 is changed by pressure exerted on resilient member 58 by, for example, a hand. Thus, a player of shaken idiophone 10 can with one hand play the instrument and affect the sound by squeezing together (or releasing pressure thereby separating) segments 22 and 24.

Also, an additional percussive sound is made when segments 22 and 24 are clapped together as shaken idiophone 10 is played against another surface, such as a hand, leg or inanimate surface.

Referring again to FIG. 1, shaken idiophone 10 has an ergonomic shape that has several gripping and/or mounting positions. For example, shaken idiophone 10 may be gripped at any position along the periphery 35 or on the crossbeam 36. Moreover, peripheral section 35 preferably has an indented or necked-down portion 60 with a comparatively reduced cross-sectional area. This necked-down portion is adapted for easy gripping by a hand. Moreover, the edges of shaken idiophone 10 are preferably radius edges that are comfortable to grip. In addition, fasteners 50 are preferably recessed as shown in FIGS. 3 and 4. This recessing is to avoid having the user or player strike the fastener when playing the shaken idiophone 10.

Shaken idiophone may be made of any material that is suitably rigid, such as, for example, plastic, metal, wood, or any combination thereof.

The present invention having been thus described with particular reference to a preferred form thereof, it will be obvious that various changes and modifications may be made therein without departing from the spirit and scope of the present invention.

The invention claimed is:

1. A shaken idiophone comprising:

a pair of independent segments positioned to define a sound chamber, said sound chambers for holding a material for producing sound when the shaken idiophone is moved;

at least one fastener for connecting said pair of segments, said at least one fastener having a resilient member said at least one fastener for holding said pair of segments in close proximity to, but spaced from, one another by said resilient member for urging said pair of segments away from one another, whereby the space between said pair of segments varies during playing of the musical instrument by selectively squeezing said pair of segments together.

2. The shaken idiophone of claim 1, wherein each of said pair of segments has a peripheral portion.

3. The shaken idiophone of claim 2, wherein each peripheral portions is divided into a plurality of cavities.

4. The shaken idiophone of claim 2, wherein at least one of said pair of segments has a crossbeam extending along a diameter defined by said peripheral portion of said at least one of said pair of segments.

5. The shaken idiophone of claim 1, wherein each of said pair of segments is substantially circular or oblong.

6. The shaken idiophone of claim 1, wherein said upper and lower segments are made of a rigid material.

7. The shaken idiophone of claim 1, wherein said resilient member is a spring.

8. The shaken idiophone of claim 1, wherein said fastener further comprises a screw and nut or cap.

9. The shaken idiophone of claim 1, wherein said pair of segments are ergonomically shaped such that the shaken idiophone may be gripped at multiple positions.

10. The shaken idiophone of claim 1, wherein each of said pair of segments have a peripheral portion, and wherein said two peripheral portions define a necked-down section.

11. A shaken idiophone comprising:

a first segment having an upper peripheral portion; and a second segment adapted to mate with said first segment, and having a lower peripheral portion, said upper and lower peripheral portions defining a substantially tubular sound chamber shaped to hold a sound producing material, at least one fastener having a resilient member connecting said pair of segments, said at least one fastener for holding said pair of segments in close proximity to, but spaced from, one another by said resilient member for urging said pair of segments away from one another, whereby the space between said pair of segments varies during playing of the musical instrument by selectively squeezing said pair of segments together.

12. The shaken idiophone of claim 11, wherein each of said upper and lower peripheral portions is divided into a plurality of cavities.

13. The shaken idiophone of claim 11, wherein said first and second segments define a crossbeam extending along a diameter defined by said upper and lower peripheral portions.

14. The shaken idiophone of claim 11, wherein said first and second segments are made of plastic.

15. The shaken idiophone of claim 11, wherein said first and second segments are ergonomically shaped such that the shaken idiophone may be gripped at multiple positions.

16. The shaken idiophone of claim 11, wherein said upper and lower peripheral portions define a necked-down section.

17. The shaken idiophone of claim 11, wherein said fastener further comprises a screw and a cap nut.

18. The shaken idiophone of claim 11, wherein said resilient member is a spring.

* * * * *